Figure 1:
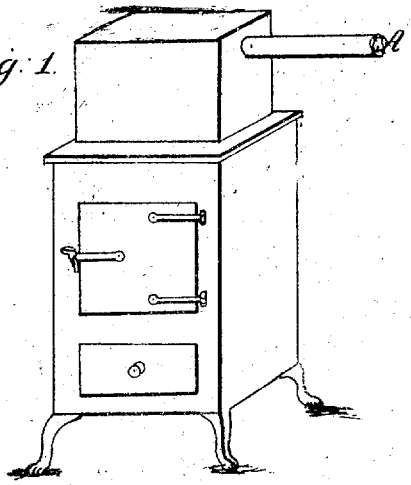
Figure 2:
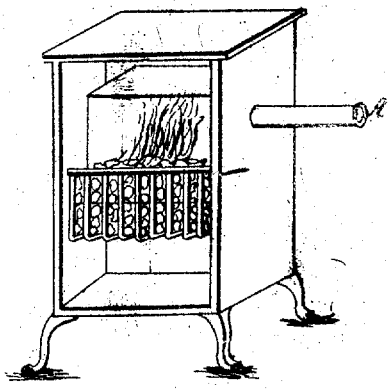
Figure 3:
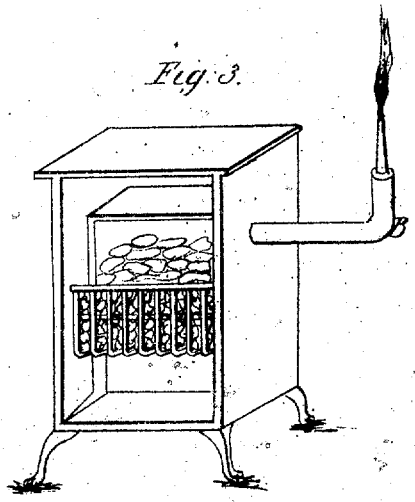
Figure 3:
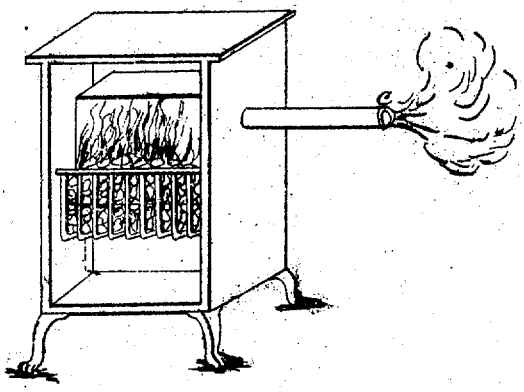

1825X

Z. Phinney,

Heating Stove.

No. 1,825X

Patented Oct. 31. 1812.

NO PRINTED COPY OF SPECIFICATION IN OFFICE

Stove with Box containing Water.

Zina Phinny

1825X

Letters Patent

The Schedule referred to in these Letters Patent and making part of the same containing a description in the words of the said Zina Phinny himself, of his improvement in the saving of fuel.

1st. A Box of sheet wrought or cast iron placed on a stove with the outer edges closed over the stove; with a pipe or conductor to convey the heat to any part of that or another room; or into an oven. The same box may be placed in the fire: with the addition of a bottom, the opposite end from the pipe being left open suitable for a draught.

2d. This Box may be used for heating ovens of any description, or for Kiln drying Corn, and will be found particularly useful in baking for armies in camp. also in placing the same in Tan yards and conveying the pipe through the vats. the business of tanning will be greatly facilitated in cold water.

3d. The said Box (being filled with chips or fuel and by closing the draught will afford sufficient light for a room by setting the smoke on fire at the end of the pipe. A common stove may be used in the same way and the coals saved after the smoke is evaporated. and the same Box made to hold water will produce steam sufficient for cooking 4th. The Box being supplied with tar with a tube containing a lighter which will afford a good light. a pipe should be suspended to carry off the smoke.

Zina Phinny

Witnesses.
James O. Wattles
N. F. Randell

Exd. W.T.

(270 [illegible]) ( Patented Oct 31st 1812 )